United States Patent [19]

Anderson

[11] Patent Number: 4,748,300
[45] Date of Patent: May 31, 1988

[54] LIQUID LEVEL INDICATOR SWITCH

[76] Inventor: Donald D. Anderson, 4145 Southwind, Las Cruces, N. Mex. 88005

[21] Appl. No.: 696,603

[22] Filed: Jan. 30, 1985

[51] Int. Cl.⁴ .................. H01H 35/18; H01H 9/00
[52] U.S. Cl. ................... 200/84 C; 73/308; 340/624
[58] Field of Search .............. 73/307, 308, 313; 340/623, 624; 307/118; 116/228; 335/205; 200/83 T, 84 R, 84 C

[56] References Cited

U.S. PATENT DOCUMENTS

| | | | |
|---|---|---|---|
| 2,885,507 | 5/1959 | Holman | 200/84 R |
| 2,953,659 | 9/1960 | Edwards | 200/83 T |
| 3,782,501 | 1/1974 | Pagella | 340/624 |
| 4,103,265 | 7/1978 | Siiberg | 200/84 C |
| 4,377,809 | 3/1983 | Lawford | 340/623 |
| 4,487,021 | 12/1984 | Arakawa | 200/84 C |

Primary Examiner—G. P. Tolin
Attorney, Agent, or Firm—Saul Elbaum; Alan J. Kennedy; Thomas E. McDonald

[57] ABSTRACT

A liquid level indication device including a reed switch activating assembly having a magnet moveable in response to a change in the level of the liquid to effect the closing of the reed switch contact elements when a designated liquid level is reached. The device has a built-in time delay feature to prevent the premature actuation of the reed switch by the magnet should the liquid level in the container only temporarily drop.

3 Claims, 3 Drawing Sheets

LIQUID DRAINS SLOWER FROM TUBE
KEEPS DIVER FROM SWITCH

TUBE REFILLS THRU LARGE HOLE BEFORE
DIVER ACTIVATES SWITCH

IF LIQUID REMAINS LOW DIVER SINKS
AND ACTIVATES SWITCH AND ALARM

4,748,300

LIQUID LEVEL INDICATOR SWITCH

RIGHTS OF THE GOVERNMENT

The invention described herein may be manufactured and used by or for the Government for governmental purposes without the payment to me of any royalty thereon.

BACKGROUND OF THE INVENTION

This invention relates generally to devices responsive to the level of a liquid. Particularly, this invention relates to a liquid level indication system having a reed switch actuating assembly wherein a magnet is moveable to effect the opening and closing of the reed switch contact elements. The invention further includes a time delay means to prevent the premature indication of the a low liquid level in a container.

Liquid level indicator devices are known to employ magnetic means in response to a change in liquid level in a tank or reservoir to effect the closing of the reed contact elements of a reed switch. Conventionally, a permanent magnetic is moved in a direct response to a change in liquid level in such a manner that when the magnet rises to drops to a position adjacent to a reed switch, the reed switch contacts close to energize an alarm system to indicate said change in the liquid level.

This invention has a variety of applications for which it could be utilized. For example it could be used to monitor or control the level of liquid in fuel storage tanks utilized by the armed services, vehicle service stations or the agricultural industry. It could be used to monitor or control the level of liquids for chemical storage tanks for industrial users.

This invention could also be used to monitor or control liquid levels for water storage tanks. Many rural families have domestic wells that use holding tanks. These tanks must be pre-pressurized to work properly. Normally the well pump can supply enough water to the holding tank while water is being utilized; however, there are times when it cannot. The liquid level indicator switch assembly could be installed in the holding tank to alarm the user that the liquid level in the tank is getting low or even shut off the drain valve. This is important because it is somewhat costly to have the holding tank repressurized everytime the tank drains.

SUMMARY OF THE INVENTION

In this invention, a magnet is contained within a float which is in turn disposed within one chamber of a dual chamber housing. A magnetically-activated reed switch is mounted in the other chamber of the housing at a predetermined position. An alarm system is electrically coupled to the reed switch. If the fluid level within the chamber containing the float decreases to the point that the magnet is within a predetermined distance from the reed switch, the switch is actuated by the magnet to close thereby completing an electrical circuit and activating the alarm.

A built-in time delay is also incorporating into this invention by means of a small diameter drain orifice located near the bottom of the chamber housing the float. This small orifice slows the drain rate of the liquid in the chamber which results in delaying the time the float decreases in its descent to the point that allows the magnet to activate the reed switch. This feature is important to prevent a false alarm should the liquid level in the container or reservoir, being monitored, only temporarily drop. Another orifice is located above the small orifice. This orifice is much larger in diameter than the small drain orifice and is necesary to allow the chamber to refill more quickly when the liquid in the container or reservoir begins to refill. In effect, the large orifice is used to reset the time delay feature of this invention.

It is an object of the present invention to provide a liquid level indicator having a reed switch which is actuated by a magnet, said indicator to include a built-in time delay feature to prevent a false alarm.

Another object of the present invention is to provide a liquid level indicator or monitoring apparatus that is capable of operating a remotely located alarm device, and does not require electrical power to operate the switch.

Another object of the present invention is to provide a liquid level indicator or monitoring apparatus that is inexpensive and reliable.

Another object of the present invention is to provide a liquid level indicator that can be placed directly into the liquid to be monitored.

These and other objects and advantages of the present invention will become more apparent upon reference to the following specification when taken in conjunction with the accompanying drawings.

DESCRIPTION OF THE PREFERRED EMBODIMENT

Figure 1:
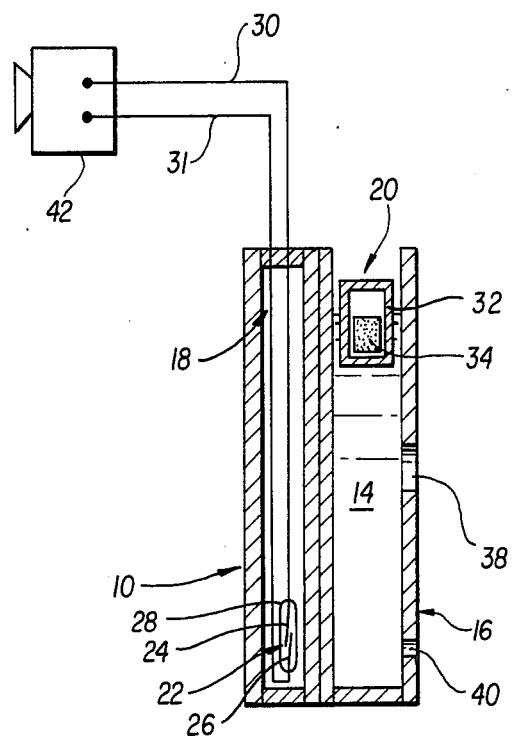
FIG. 1 is a partial vertical sectional view of the liquid level indicator switch in the open position.

Referring now to the drawings, and in particular to FIG. 1, a liquid level indicator switch assembly in accordance with the present invention is generally indicated at 10. The switch assembly 10 includes a housing 16 which is comprised of dual tubular chambers, 18 and 20 which are bottom sealed. Tubular chamber 20 contains two orifices 38 and 40 which allow for a liquid 14 to flow into and out of tubular chamber 20. In this embodiment, upper orifice 38 is larger than lower orifice 40. Housing 16 can be made of plastic or any non-magnetic material that is corrosive resistant to the liquid 14 which level is to be sensed.

Tubular chamber 18 of housing 16 contains a switch means, generally indicated at 22, comprising a conventional reed switch having two elongated, magnetizable, electrically-conducting reed contact elements 24 and 26. These elements are enclosed in a sealed hollow tubular casing or envelope 28 made of insulating material such as glass. The reed contact elements 24 and 26 overlap for a fraction of their respective lengths and are normally separated by a short gap. The contact elements 24 and 26 extend through opposite ends of envelope 28, and electrical lead wires 30 and 31 are connected to the extended end portions of contact elements 24 and 26. The diameter of tubular chamber 18 is slightly larger than the outer diameter of envelope 28 such that reed switch 22 will be positioned in a vertical upright position within tubular chamber 18.

Tubular chamber 20 of housing 16 supports a switch actuation means in the form of float 32. Located within float 32 is a magnet 34, which is a permanent magnet in this embodiment. The diameter of tubular chamber 20 is slightly larger than the width of float 32, such that the magnet 34 will be confined to more within a predetermined distance of reed switch 22. The magnet 34 is positioned with its N-S axis approximately parallel to reed switch 22, and magnet 34 must have a magnetic field of sufficient strength close contacts 24 and 26 when aligned adjacent to reed switch 22.

Electrical lead wires 30 and 31 runs from the extended end portions of contact elements 24 and 26 of reed switch 22 through tubular column 18 of housing 16 to alarm 42. No electrical power is required to operate the reed switch; however, it should be noted that the alarm system will require an electrical power source such as a battery to power the indicating means of the alarm. The indicating means can be a warning lamp, buzzer, etc. which, along with the alarm assembly, can be located remotely from the liquid container which level is being sensed.

Figure 2:
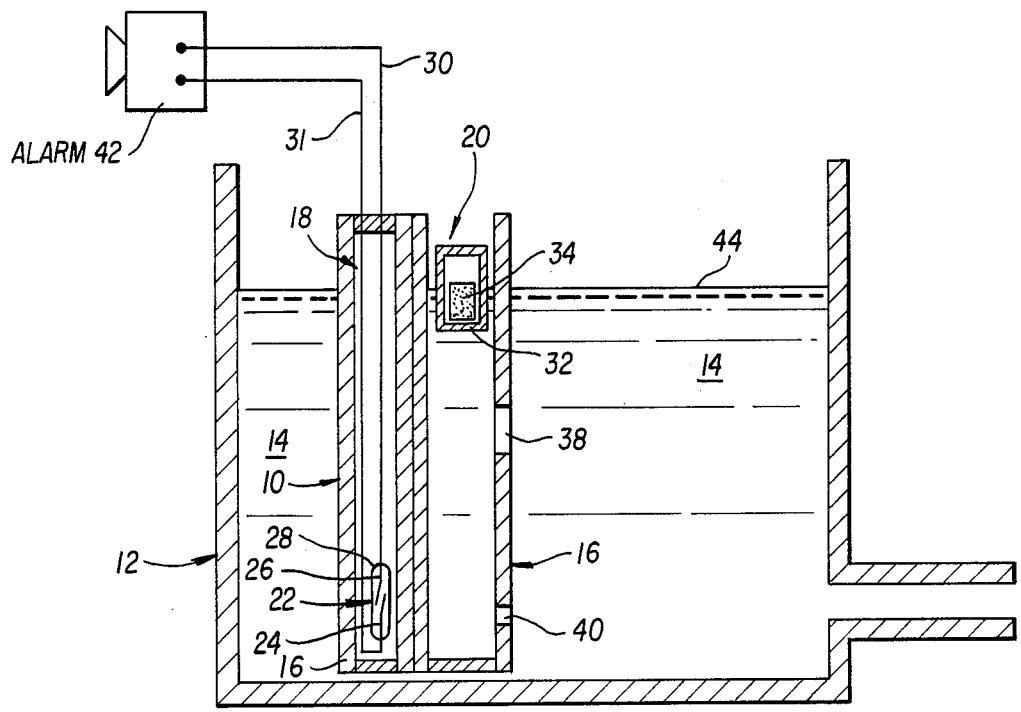
FIG. 2 is a partial sectional view of the liquid level indicator switch according to the invention, illustrating the switch as installed in a reservoir filled with liquid.

In operation, as is illustrated in FIG. 2, in its normal position reed switch 22 is open, that is, there is a small gap between contact elements 24 and 26. This is because when the reservoir or container 12 is adequately filled with liquid 14, the float 32 which contains permanent magnet 34 will be positioned at a distance far enough above reed switch 22 such that the magnetic field will be too weak to actuate the reed switch 22. However, when the level of the liquid in container 12 drops or falls, magnet 34 will move downwardly in tubular chamber 20. When the quantity of liquid within container 12 is sufficiently diminished such that magnet 34 is aligned within a predetermined distance from reed switch 22, the field of the magnet causes contact elements 24 and 26 to move into contact with one another, thereby closing the normally open contacts and actuating reed switch 22. This action results in the closing of the electrical circuit containing alarm 42 to activate the alarm to indicate that a low liquid level within container 12 has occurred. It should be noted that instead of coupling the reed switch to an alarm, it could be connected to a refill valve or to a monitoring device.

A unique feature of this invention is that it has a built-in time delay feature. As was stated earlier, tubular chamber 20 of housing 16 contains two orifices 38 and 40. Orifice 38 is positioned vertically above lower orifice 40. These orifices will cause a time delay or safety precaution feature, in that, should the liquid level in tubular chamber 20 temporarily drop but quickly rise again, a false alarm will not be indicated. Because orifice 40 is small in diameter which restricts the drain rate of tubular chamber 20, the level of the liquid in tubular chamber 20 will not drop quickly enough to bring magnet 34 within range of reed switch 22 such that the magnetic field will close contacts elements 24 and 26. If container 12 starts to refill before tubular chamber 20 drains, the magnet 34 is prevented from dropping close enough to reed switch 22 to activate the reed switch. Tubular chamber 20 will quickly refill through orifice 38 which is larger in diameter than orifice 40. In effect, orifice 38 is used to reset the time delay feature. However, should container 12 permanently drain, tubular chamber 20 will also eventually drain via orifice 40. Now magnet 34 will fall to a postiion adjacent to reed switch 22 and its magnetic field will close contact elements 24 and 26 thereby activating alarm 42.

Figure 3:
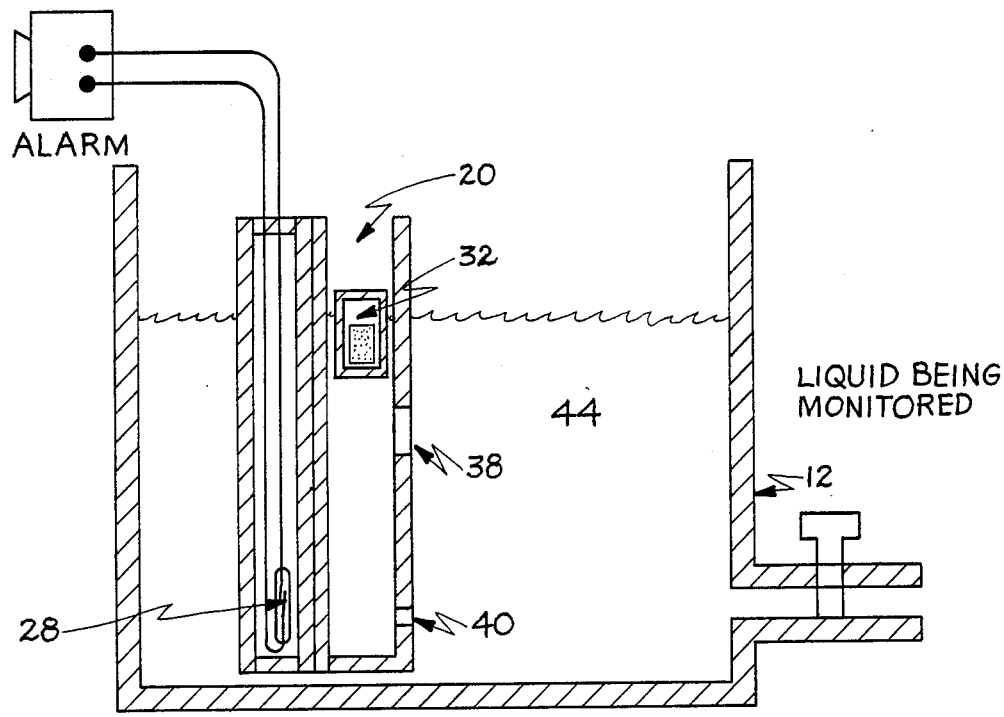
FIGS. 3, 4, 5 and 6 illustrate the time delay feature of this invention.
Figure 4:
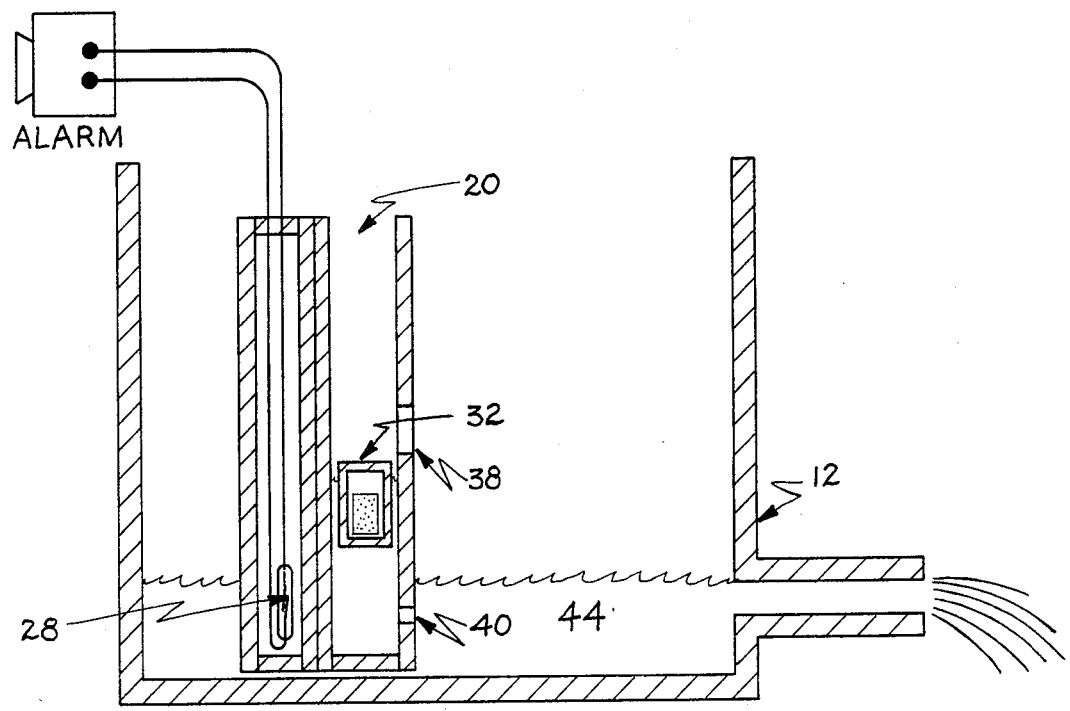
Figure 5:
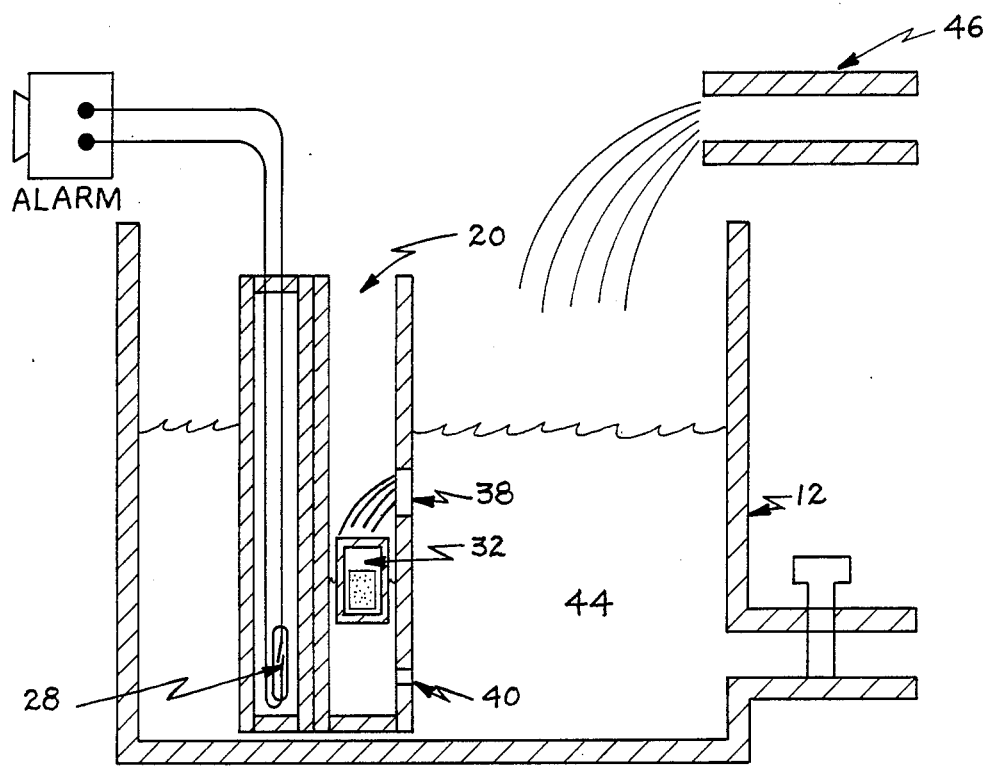
Figure 6:
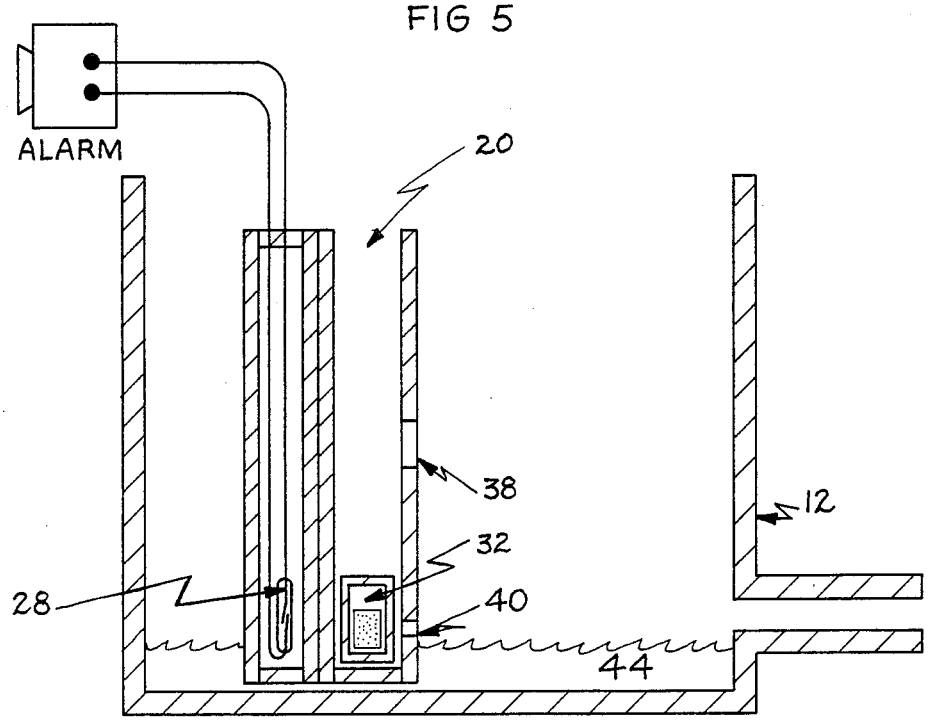

This time delay feature is illustrated in FIGS. 3, 4, 5 and 6. In FIG. 3, reservoir 12 is shown in the condition with the liquid 44 to be monitored in the filled position. In FIG. 4, the condition is shown wherein container or reservoir 12 has drained but because the liquid 44 drains more slowly from chamber 20 of the diver switch housing than it does from the reservoir 12, the higher water level in chamber 20 of the diver switch housing prevents the magnetic float 32 from activating the reed switch 28. FIG. 5 shows the condition where a refill valve or refill mechanism 46 refills the reservoir 12 with liquid and in turn refills chamber 20 of the switch housing through large orifice 38 before magnetic float 32 activates switch 28. However, should the liquid level in reservoir 12 remain low, the magnetic float 32 will sink and activate the switch 28 and in turn alarm 42, as is shown in FIG. 6.

Further modifications of the above described liquid level indicator device will become apparent to those skilled in the art. Accordingly, the above discussion is intended to be illustrative but not restrictive of the scope of the invention, that scope being defined by the following claims and all equivalents thereto.

What is claimed is:

1. A magnetic switch assembly which indicates the level of liquid in a container and includes a time delay device comprising:

a housing which is placed in the container of liquid, said housing having first and second tubular chambers which are mounted adjacent to and parallel to one another; a magnetically actuable switch having at least one pair of contacts located within said first tubular chamber of said housing; a magnet for actuating said magnetic switch when a given liquid level is reached; a float in which said magnet is disposed, said float being located within said second tubular chamber of said housing, said float varying in position with the level of liquid in said second chamber; wherein said time delay device includes a means for delaying the actuation of said magnetically actuable switch to prevent a premature indication that the given liquid level has been reached; and wherein said second tubular chamber of said housing includes a large orifice and a small orifice, said large orifice being located above said small orifice, wherein said orifices allow said container to fill and drain the liquid being monitored, wherein said small orifice allows the liquid in the second tubular chamber to drain at a slower flow rate than the liquid draining from said container, and said large orifice is utilized to refill said second tubular chamber quickly when the liquid level in said container rises, and said second tubular chamber is not in fluid communication with said first tubular chamber.

2. The device of claim 1 wherein said magnetically actuable switch is a reed switch.

3. The device of claim 1 wherein said means for actuating said magnetic switch is a permanent magnet.

* * * * *